United States Patent [19]

Vaughan

[11] 3,963,198
[45] June 15, 1976

[54] NEGATIVE AIR CUSHION FOR AIRSHIP GROUND HANDLING

[75] Inventor: John C. Vaughan, Rockville, Md.

[73] Assignee: The United States of America as represented by the Secretary of the Navy, Washington, D.C.

[22] Filed: Apr. 2, 1975

[21] Appl. No.: 564,570

[52] U.S. Cl. .............................. 244/100 A; 180/128; 244/30; 244/103 W
[51] Int. Cl.² ........................................ B60V 3/08
[58] Field of Search ............ 244/100 A, 102 R, 105, 244/114 R, 115, 30, 103 W; 114/206 R; 180/115, 116, 119, 124, 127, 128; 104/44

[56] References Cited
UNITED STATES PATENTS

| 1,656,236 | 1/1928 | Powelson et al. ................. 244/105 |
| 2,736,520 | 2/1956 | Chichester ....................... 244/114 R |
| 3,338,176 | 8/1967 | Petersen ......................... 104/44 X |
| 3,790,110 | 2/1974 | Earl ............................... 180/128 X |
| 3,892,287 | 7/1975 | Bennett ......................... 114/206 R X |

Primary Examiner—Trygve M. Blix
Assistant Examiner—Barry L. Kelmachter
Attorney, Agent, or Firm—R. Sciascia; R. Beers; S. Sheinbein

[57] ABSTRACT

A mooring and landing device for aircraft which are capable of vertical descent for landing comprising an inflatable tube-type device, or trunk, attached to the bottom surface of the craft. The trunk is in the shape of a doughnut and the open interior compartment formed by the inflated trunk and the bottom surface of the craft is evacuated to a pressure lower than atmospheric so that the difference between the compartment pressure and the atmospheric pressure moors the craft to the ground. The trunk is inflated to a pressure greater than atmospheric and may be formed with a plurality of holes to provide an air cushion for lubrication purposes.

4 Claims, 8 Drawing Figures

NEGATIVE AIR CUSHION FOR AIRSHIP GROUND HANDLING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to aircraft landing and mooring devices, especially to a suction-type mooring device for an airship capable of hovering-type descent.

To moor an airship of the dirigible type, it is necessary to cast down lines from the airship which are grasped by ground crew members who pull the ship down to the ground and make the mooring lines fast. Where the nose of the airship is aligned with a mooring mast, the ground crew members attempt to control the movements of the ship until the nose locks into place. The difficulty with this system is that it takes too much manpower to dock an airship and is a lengthy, cumbersome process.

SUMMARY OF THE INVENTION

The objects and advantages of the present invention are accomplished by fitting a hovering-type aircraft with a trunk at the bottom of the aircraft. The trunk is inflated with air at a pressure higher than atmospheric. The trunk circumscribes a space which is sealed on top and open on bottom. This space is evacuated to a pressure which is lower than atmospheric so that, when the craft lands on a surface, suction keeps the craft moored to the surface.

An object of the present invention is to enable a hovering-type aircraft to land and be moored to the ground without any assistance.

A further object is to decrease the amount of ground area required by a moored weathervaning airship.

Other objects, advantages and novel features of the present invention will become apparent from the following detailed description of the invention when considered in conjunction with the accompanying drawings.

DETAILED DESCRIPTION OF THE INVENTION

Figure 1:
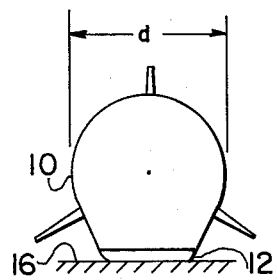
FIG. 1 is a pictorial front view of an airship employing the invention.
Figure 2:
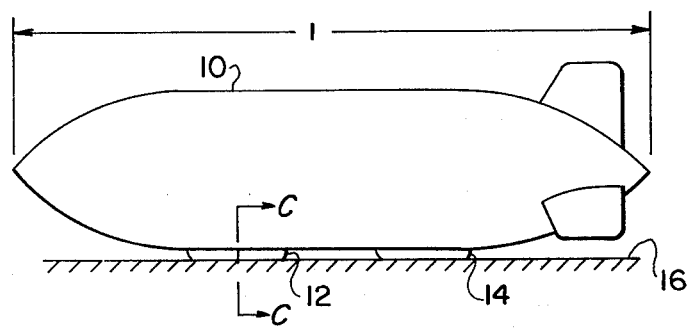
FIG. 2 is a pictorial side view of an airship employing the invention.

FIG. 1 shows a pictorial view of an airship 10 of the gas-filled, or lighter-than-air type, as seen from the front. The diameter of the gas bag is denoted by the letter $d$. The airship 10 is shown resting on a pair of trunks 12 and 14 (see, also, FIG. 2) which, in turn, are shown resting on the ground 16. The length of the airship is denoted by the letter $l$.

Figure 3:
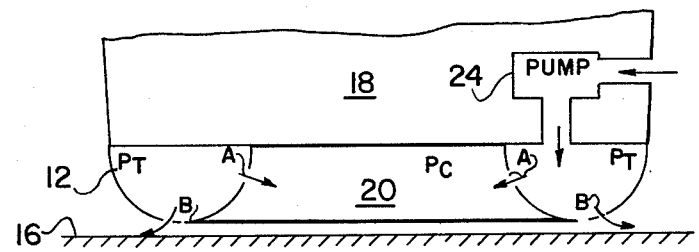
FIG. 3 is a schematic view, partially broken away, of a typical, prior art, air cushion landing system.

FIG. 3, which is part of the prior art, shows a typical air cushion landing system, which might be attached to the bottom of an aircraft 18, for example. The trunk 12 is in the form of a toroid or doughnut and the central compartment 20 in the doughnut is sealed by the ground upon landing. A pump 24, situated in the lower part of the aircraft 18 to which the trunk 12 is attached, pumps air from the atmosphere into the trunk 12 pressurizing it to a pressure, $P_T$, which is greater than atmospheric pressure. Some of the pressurized air passes through one or more holes A into the central compartment 20 and through holes B along the ground to maintain the cushion pressure $P_c$ and to provide lubrication between the trunk and the ground. The cushion pressure $P_c$ is also greater than atmospheric (although lower than trunk pressure) and supports the weight of the aircraft 18 by acting over the bottom portion of the aircraft, which is enclosed by the trunk.

Figure 4:
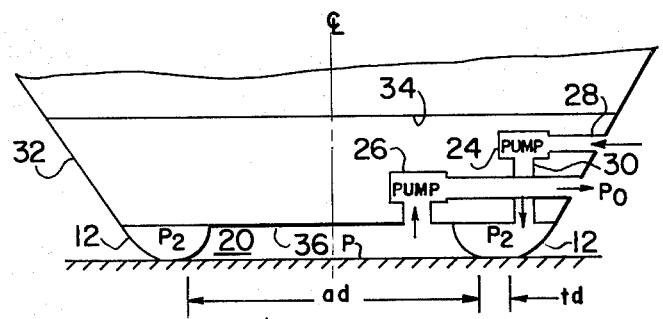
FIG. 4 is a sectional view of the airship shown in FIG. 2 taken along the line C-C.

FIG. 4 illustrates how the negative air cushion (NAC) concept is applied to an airship 10. Here the trunk 12 has the usual open (at the bottom) central compartment 20. Prior to the trunk making contact with the ground, a pump 24 pumps air in from the atmosphere at atmospheric pressure $P_o$ into the trunk 12 at higher-than-atmospheric pressure $P_2$. After raising the trunk pressure $P_2$ to its desired higher-than-atmospheric value, the conduits 28 or 30 can be shut to seal off the trunk 12. At the same time, pump 26 evacuates the central compartment 20, so that a cushion pressure $P_1$ is developed which is less than atmospheric, $P_o$. This pressure difference $P_o-P_1$ creates a suction which clamps the airship to the ground. Maintaining the pressure $P_1$ at less than atmospheric keeps the airship anchored to the ground. All the pump 26 has to do is to remove the air which leaks into the central compartment 20 once the airship 10 is grounded. It should be noted that, if appropriate valves are used, only one pump could be used.

The shape of the trunk 12 may be other than a doughnut; e.g., it may be a square or a rectangle. What is essential is that it have an outer inflatable portion surrounding an inner compartment which can be evacuated and is uncovered on the bottom side so that suction can be applied to the ground.

The trunk should be fabricated from a fluidtight, inflatable fabric, such as rubberized nylon, for example.

As can be seen in FIG. 4, the trunk 12 is attached to and suspended from a base 32 which also acts as a support for the pumps and their associated conduits. The bottom surface 36 of the base seals off the central compartment 20 (except for the opening of the conduit to the evacuation pump 26). The top surface 34 may be sealed to the gas bag or may be swivelable with respect to the gas bag.

The airship 10 must be able to weathervane, i.e., swivel with wind pressure so that it faces into the wind, thereby presenting the wind with the minimum possible resistance. In the swivel methods depicted in FIGS. 5 and 6, the forward NAC base 32 is coupled to the airship hull 31 through a plurality of rollers 38, so that the airship hull rests on and is supported by these rollers. The rollers 38 rest on the base 32, so that the airship hull 31 and airship 10 can swivel about the base.

Figure 5:
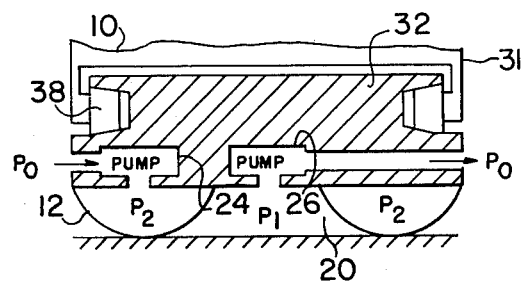
FIG. 5 is a sectional view of the trunk and base structure of a swivelable trunk.
Figure 6:
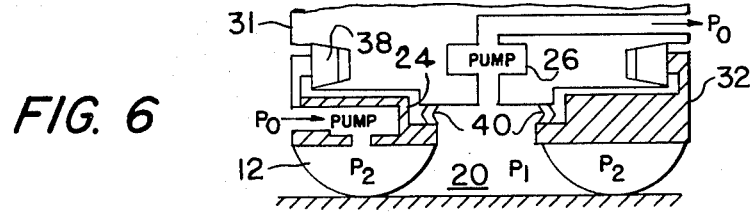
FIG. 6 is a sectional view of the trunk and base structure of another type of swivelable trunk.
Figure 7:
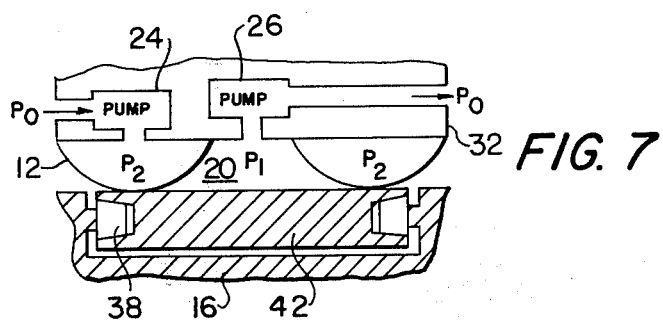
FIG. 7 is a sectional view illustrating a trunk and base resting on a turntable.

Thus, the airship rotates on rollers 38 around the vertical axis of symmetry of the trunk 12. The embodiment shown in FIG. 6 requires a seal 40 to prevent atmospheric leakage into the cushion volume, i.e., the central compartment 20 since pump 26, which evacuates the central compartment, is located in hull 31. FIG. 7 shows a swivel, or turntable, 42 which is imbedded in the ground 16 and is not part of the airship 10. Turntable 42 rests on rollers 38 (supported on the ground 16) upon which the turntable can swivel. With the arrangement shown in FIG. 5, no seal is required since solid structure effectively separates regions of differing pressures. In the designs of FIGS. 5 and 6, the NAC trunk remains stationary with respect to the ground while the airship hull is free to swivel as the wind direction changes. It should be noted that the air station real estate required to permit 360° rotation is considerably less here than if the conventional mooring mast is located at the airship nose. The second method of swiveling (FIG. 7) employs a NAC trunk fixed to the airship but a flat turntable mounted flush with the ground at the air station provides the swiveling action.

The methods mentioned above represent alternative means of obtaining airship weathervaning. The first method, wherein the forward NAC is connected to the airship through a swivel, will permit operation at virtually any suitable remote site. The second method can be used only at an established site equipped with the appropriate turntable. The obvious advantage to the second method lies in the simplified airship installation. A third possibility, applicable to the fixed site, is the use of a ground-based pump to supply the forward cushion suction. Since the forward NAC trunk need only be inflated initially and then sealed, no airship borne power need be expended to provide the airship holddown. The ground-based cushion pump could be mounted directly on the turntable or connected to the turntable through suitable rotary seals.

Regardless of the method used to allow weathervaning, the horizontal shear force between the airship and the ground, which resists the wind force, is a function of the friction coefficient between the trunk and the ground and the force pressing the trunk to the ground. This force must be supplied entirely by the forward trunk, since the aft trunk can furnish none while the airship is turning.

The aft trunk can be operated in two different ways. In the first mode, air is supplied continuously to the trunk and allowed to bleed out through lubrication holes located where the trunk is tangent to the ground. This method of operation requires a continuous power output to drive the pumps. However, the ability to reduce the horizontal friction between the trunk and the ground by this method is not certain. The second method of operating the aft trunk entails the use of sensors on the airship which detect the presence of crosswinds requiring airship weathervaning. The aft trunk would be identical to the forward trunk, i.e., it would have no bleed holes and could be sealed after inflation. When the sensors determine that the crosswind has reached some predetermined value, the cushion pressure is released, reducing the ground contact force and permitting the hull to rotate around the forward trunk. While this rotation is taking place, all external horizontal and vertical forces and moments applied to the airship are resisted by the forward trunk alone.

Figure 8:
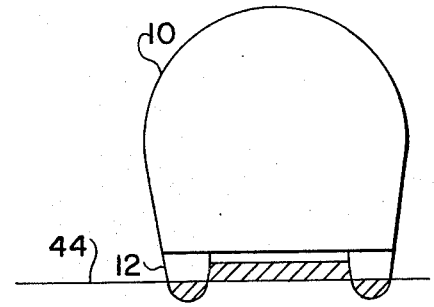
FIG. 8 is a pictorial illustration in section of an airship which has landed on a water surface.

All of the previous comments have considered only airship mooring on a solid surface. FIG. 8 illustrates the device in use on a water surface 44. Since it is not possible to develop horizontal shear forces with the water, the airship ties up to an anchored buoy or, alternatively, carries its own anchor. In either case, the weathervaning problem is solved automatically if a single anchor near the nose is used. A variation to the water-based mooring concept is the use of a raft anchored at a single point so as to be free to swivel. If the raft were large enough to receive both trunks, the airship would have complete freedom to weathervane with essentially a dry land interface.

What is claimed is:

1. A negative air cushion landing and mooring system for an aircraft capable of hovering descent comprising:
   a trunk member attached to the bottom of said aircraft;
   a central compartment,
   said trunk member encircling and forming the side walls of said central member, the top of said compartment being sealed and the bottom of said compartment being open to the atmosphere;
   means for inflating said trunk member to a pressure greater than atmospheric, said trunk member being formed from a fluidtight fabric;
   means for evacuating said central compartment to a pressure less than atmospheric, whereby suction is created which clamps said aircraft to the ground; and
   swivel means mounted between said aircraft and said trunk member,
   whereby said aircraft is enabled to rotate and weathervane about the vertical axis of symmetry of said trunk.

2. A system as in claim 1, wherein said trunk member is formed with a plurality of holes whereby pressurized air escapes from said trunk member to form a cushion of air for lubricating the space between said trunk member and the ground.

3. A system as in claim 1, wherein said trunk member is doughnut-shaped.

4. A system as in claim 1, wherein said swivel means comprises a plurality of roller means.

* * * * *